United States Patent
Yamashita et al.

(10) Patent No.: US 8,675,107 B2
(45) Date of Patent: Mar. 18, 2014

(54) PHOTOELECTRIC CONVERSION APPARATUS, CONTROL METHOD THEREOF, IMAGING APPARATUS, AND IMAGING SYSTEM

(75) Inventors: Yuichiro Yamashita, Ebina (JP); Satoshi Kato, Zama (JP); Toshiaki Ono, Ebina (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 12/877,189

(22) Filed: Sep. 8, 2010

(65) Prior Publication Data
US 2010/0328509 A1  Dec. 30, 2010

Related U.S. Application Data

(62) Division of application No. 11/780,636, filed on Jul. 20, 2007, now Pat. No. 7,817,199.

(30) Foreign Application Priority Data

Aug. 8, 2006  (JP) ................................ 2006-216216
Mar. 2, 2007  (JP) ................................ 2007-053339

(51) Int. Cl.
*H04N 3/14*  (2006.01)
*H04N 5/335*  (2011.01)

(52) U.S. Cl.
USPC ........ 348/308; 348/302; 348/301; 250/214 R; 250/214 A; 257/308; 257/159

(58) Field of Classification Search
USPC ............... 348/300–301, 308; 250/208.1, 214; 257/308, 159
See application file for complete search history.

(56) References Cited

U.S. PATENT DOCUMENTS

| | | | |
|---|---|---|---|
| 5,965,871 A | 10/1999 | Zhou et al. | 250/208.1 |
| 6,222,175 B1 | 4/2001 | Krymski | 250/208.1 |
| 6,421,085 B1 | 7/2002 | Xu | 348/308 |
| 6,423,957 B1 * | 7/2002 | Kim et al. | 250/208.1 |
| 6,441,357 B2 | 8/2002 | Ang et al. | 250/208.1 |
| 6,704,050 B1 * | 3/2004 | Washkurak et al. | 348/294 |
| 6,727,946 B1 | 4/2004 | Zhao et al. | 348/308 |

(Continued)

FOREIGN PATENT DOCUMENTS

| | | |
|---|---|---|
| JP | 2000-287131 A | 10/2000 |
| JP | 2001-230974 A | 8/2001 |

(Continued)

*Primary Examiner* — Antoinette Spinks
(74) *Attorney, Agent, or Firm* — Fitzpatrick, Cella, Harper & Scinto

(57) ABSTRACT

Each pixel has a photoelectric conversion unit configured to convert light into electrical charges and to store the electrical charges, an amplifying unit configured to amplify a signal based on the electrical charges stored in the photoelectric conversion unit and to output the signal to an output line, and a reset unit configured to reset a input part of the amplifying unit. A clip unit, which is configured to limit an electric voltage of the output line, includes an amplifying circuitry for amplifying a signal based on the electric voltage of the output line and an MOS transistor for limiting the electric voltage of the output line based on the difference in electric potential between the gate and source. The clip unit controls the electric potential of the gate of the MOS transistor by the amplifying circuitry.

4 Claims, 9 Drawing Sheets

(56) References Cited

U.S. PATENT DOCUMENTS

| | | | |
|---|---|---|---|
| 6,881,944 B2 | 4/2005 | Ohsawa et al. | 250/208.1 |
| 6,973,265 B2 | 12/2005 | Takahashi | 396/121 |
| 7,135,665 B2 | 11/2006 | Matsuda et al. | 250/208.1 |
| 7,633,539 B2 | 12/2009 | Yamashita | 348/294 |
| 2002/0140844 A1 | 10/2002 | Kurokawa et al. | 348/362 |
| 2003/0133627 A1 | 7/2003 | Brehmer et al. | 382/308 |
| 2004/0130378 A1* | 7/2004 | Kihara | 327/362 |
| 2004/0155973 A1 | 8/2004 | Bea et al. | 348/308 |
| 2005/0168607 A1 | 8/2005 | Han | 348/308 |
| 2005/0225653 A1 | 10/2005 | Masuyama et al. | 348/241 |
| 2006/0081766 A1* | 4/2006 | Yuki et al. | 250/208.1 |
| 2006/0238633 A1 | 10/2006 | Kinugasa et al. | 348/300 |
| 2007/0115377 A1 | 5/2007 | Noda et al. | 348/294 |
| 2008/0029793 A1 | 2/2008 | Watanabe et al. | 257/291 |

FOREIGN PATENT DOCUMENTS

| | | |
|---|---|---|
| JP | 2003-018468 A | 1/2003 |
| JP | 2003-259219 A | 9/2003 |
| JP | 2004-007394 A | 1/2004 |
| JP | 2004-222273 A | 8/2004 |
| JP | 2004-320346 A | 11/2004 |
| JP | 2004-336473 A | 11/2004 |
| JP | 2005-057612 A | 3/2005 |
| JP | 2005-136922 A | 5/2005 |
| JP | 2005-223908 A | 8/2005 |
| JP | 2005-303746 A | 10/2005 |
| JP | 2006-261932 A | 9/2006 |

* cited by examiner

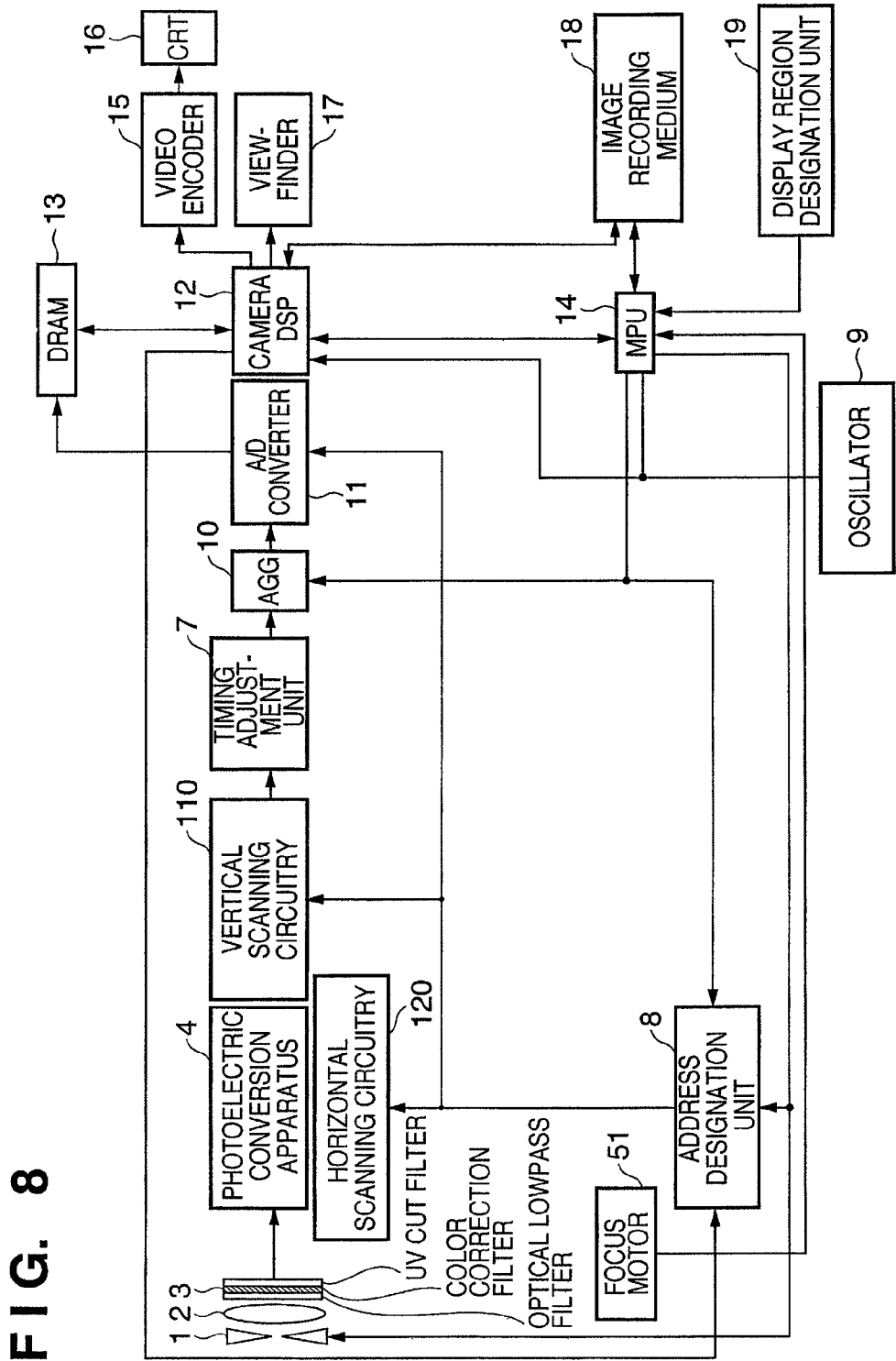

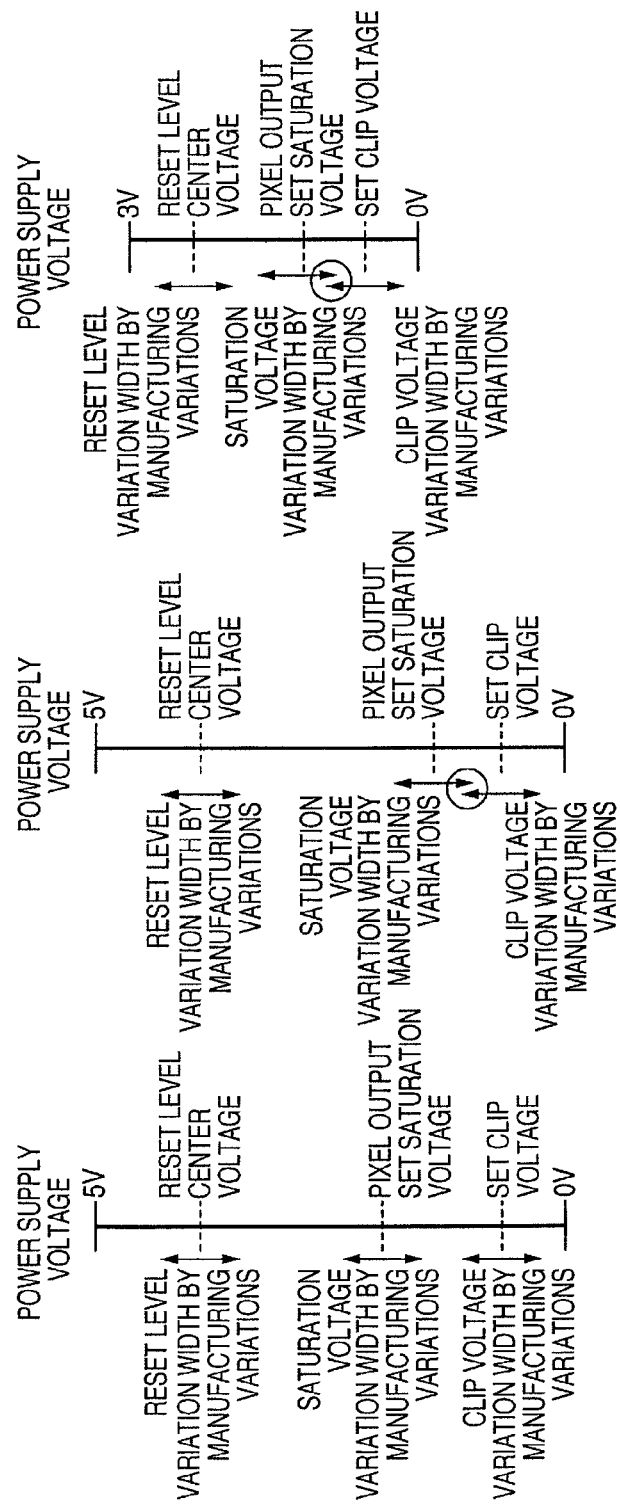

PHOTOELECTRIC CONVERSION APPARATUS, CONTROL METHOD THEREOF, IMAGING APPARATUS, AND IMAGING SYSTEM

CROSS REFERENCE TO RELATED APPLICATION

This application is a division of U.S. application Ser. No. 11/780,636, filed on Jul. 20, 2007, the entire disclosure of which is hereby incorporated by reference herein.

BACKGROUND OF THE INVENTION

1. Field of the Invention

The present invention generally relates to a method and apparatus for preventing degradation in image quality of a photoelectric conversion apparatus due to reception of light from a strong light source.

2. Description of the Related Art

An imaging apparatus such as a digital camera generally includes a photographing optical system and a photoelectric conversion apparatus that photoelectrically converts an object image formed by the photographing optical system. Photoelectric conversion apparatuses can be divided into either passive pixel sensors (PPS) or active pixel sensors (APS). PPSs are non-amplification sensors whose pixels have no function of amplifying electrical charges. PPSs include, for example, a CCD image sensor. APSs are amplification sensors whose pixels have a function of amplifying electrical charges. APSs include, for example, a CMOS image sensor. A CCD image sensor is advantageous for miniaturization and can implement a simple driving method and system configuration. On the other hand, a CMOS image sensor can reduce power consumption and easily speed up the operation. For this reason, a CMOS sensor is suitable for, for example, a digital camera that requires a high operation speed and low power consumption.

When a CMOS sensor receives light as spotlight from a strong light source such as the sun, in particular, the output electric potential difference between rows that have received the light and rows that have not received the light sometimes generates a luminance difference around the spotlight. Additionally, blackening may take place; a part which has been struck by a particularly strong light component of the spotlight blackens. There are various ideas to solve these problems.

Japanese Patent Laid-Open No. 2001-230974 (Paragraph No. 0018; FIG. 2) discloses a technique of solving the luminance difference generated around the spotlight by the output electric potential difference between rows that have received the light and rows that have not received the light. Japanese Patent Laid-Open No. 2001-230974 prevents a load transistor serving as a load of an amplification transistor in a pixel from being turned off by operating a clip means for preventing the electric voltage of a vertical output line from becoming lower than a predetermined voltage in reading the signal level of a pixel that has received strong light. This suppresses the output electric potential difference between rows that have received the spotlight and rows that have not received the spotlight.

Japanese Patent Laid-Open No. 2004-222273 (Paragraph No. 0030; FIG. 2A) discloses a technique of causing a voltage adjusting unit to clip a pixel output signal of reset level and replacing a pseudo signal generated by incidence of strong light with the voltage set by the voltage adjusting unit. The operation principles of the circuitry described in Japanese Patent Laid-Open No. 2004-222273 are the same as in Japanese Patent Laid-Open No. 2001-230974 except that the former executes the clip operation not for the signal level but for the reset level.

However, in the invention of Japanese Patent Laid-Open No. 2001-230974, the set pixel saturation voltage (to be referred to as a "set saturation voltage" hereinafter) needs to sufficiently separate from the set voltage value (to be referred to as a "set clip voltage" hereinafter) of the vertical output line by the clip circuitry, as shown in FIG. 9A. However, when the set saturation voltage should be closer to 0 V, as shown in FIG. 9B, or the power supply voltage should be low, as shown in FIG. 9C, the set clip voltage and set saturation voltage are close to each other. If the set clip voltage and set saturation voltage are close to each other, the set clip voltage and set saturation voltage may reverse, as indicated by circles in FIGS. 9B and 9C, due to threshold variations of the source follower transistor of a pixel or clip circuitry or manufacturing variations of the set clip voltage. When the set clip voltage and set saturation voltage reverse, the apparatus outputs not the set saturation voltage but a predetermined voltage set by the clip circuitry even when the pixel receives strong light. For this reason, even when strong light is uniformly incident on the screen, the pixel exhibits a low-luminance output such as gray, resulting in degradation in image quality.

If the set clip voltage and set saturation voltage are close to each other, the electric potential difference between the gate and source of the source follower transistor of the clip circuitry is small when a pixel outputs a saturation voltage. This increases the subthreshold current in the source follower transistor of the clip circuitry. In this case, the extra current path outside the source follower transistor of the pixel causes the voltage upon saturation to vary as compared to a structure without clip circuitry or a structure in which the set clip voltage is sufficiently separate from the set saturation voltage. The degree of closeness changes between pixels or rows due to manufacturing variations in the threshold value of the source follower transistor of the pixel or clip circuitry. This considerably degrades the image quality; the luminance on the whole screen suffers graininess.

In the invention of Japanese Patent Laid-Open No. 2004-222273, the clip level must be lower than the reset level to prevent blackening in terms of operation principles. However, if they have a large electric potential difference, and the clip level is low, it is unlikely that a decrease in reset level upon incidence of strong light is detected. It is therefore necessary to cause the set clip potential close to the reset level. However, if these potentials are close to each other, the reset level and set clip potential may reverse due to, for example, manufacturing variations, resulting in blackening.

SUMMARY OF THE INVENTION

The present invention is provided to prevent degradation in image quality of a photoelectric conversion apparatus due to reception of light from a strong light source effectively, thereby improving the subthreshold characteristics in such cases.

According to the first aspect of the present invention, there is provided a photoelectric conversion apparatus comprising a plurality of pixels, each pixel having a photoelectric conversion unit configured to convert light into electrical charges and to store the electrical charges, an amplifying unit configured to amplify a signal based on the electric charges stored in the photoelectric conversion unit and to output the signal to an output line, and a reset unit configured to reset an input part of the amplifying unit, and a clip unit configured to limit an electric voltage of the output line, the clip unit including an amplifying circuitry for amplifying a signal based on the electric voltage of the output line and an MOS transistor for limiting the electric voltage of the output line based on the difference in electric potential between the gate and source, the clip unit controlling the electric potential of the gate of the MOS transistor by the amplifying circuitry.

According to the second aspect of the present invention, there is provided an imaging apparatus comprising the above-described photoelectric conversion apparatus, a first scanning circuitry to sequentially select the plurality of pixels arranged on the photoelectric conversion apparatus, and a second scanning circuitry to select the output line and sequentially read out a signal from the pixel selected by the first scanning circuitry.

According to the third aspect of the present invention, there is provided an imaging system comprising a photographing optical system, the above-described imaging apparatus, the imaging apparatus photoelectrically converting an object image and generating image information.

According to the fourth aspect of the present invention, there is provided a method of controlling a photoelectric conversion apparatus comprising a photoelectric conversion unit configured to convert light into electrical charges and to store the electrical charges, an amplifying unit configured to amplify a signal based on the electrical charges stored in the photoelectric conversion unit and to output the signal to an output line, and a reset unit configured to reset an input part of the amplifying unit, and a clip unit configured to limit an electric voltage of the output line, comprising the steps of controlling an electric potential of a gate of an MOS transistor, which limits an electric voltage of the output line based on the difference in electric potential between the gate and source by amplifying a signal based on the electric voltage of the output line.

Further features of the present invention will become apparent from the following description of exemplary embodiments with reference to the attached drawings.

BRIEF DESCRIPTION OF THE DRAWINGS

FIG. 8 is a view showing an exemplary arrangement of the imaging system using the imaging apparatus according to the preferred embodiment of the present invention;

FIGS. 9A-9C are views showing problems of prior art.

DESCRIPTION OF THE EMBODIMENTS

Preferred embodiments of the present invention will be described below in detail with reference to the accompanying drawings.

First Embodiment

Figure 1:
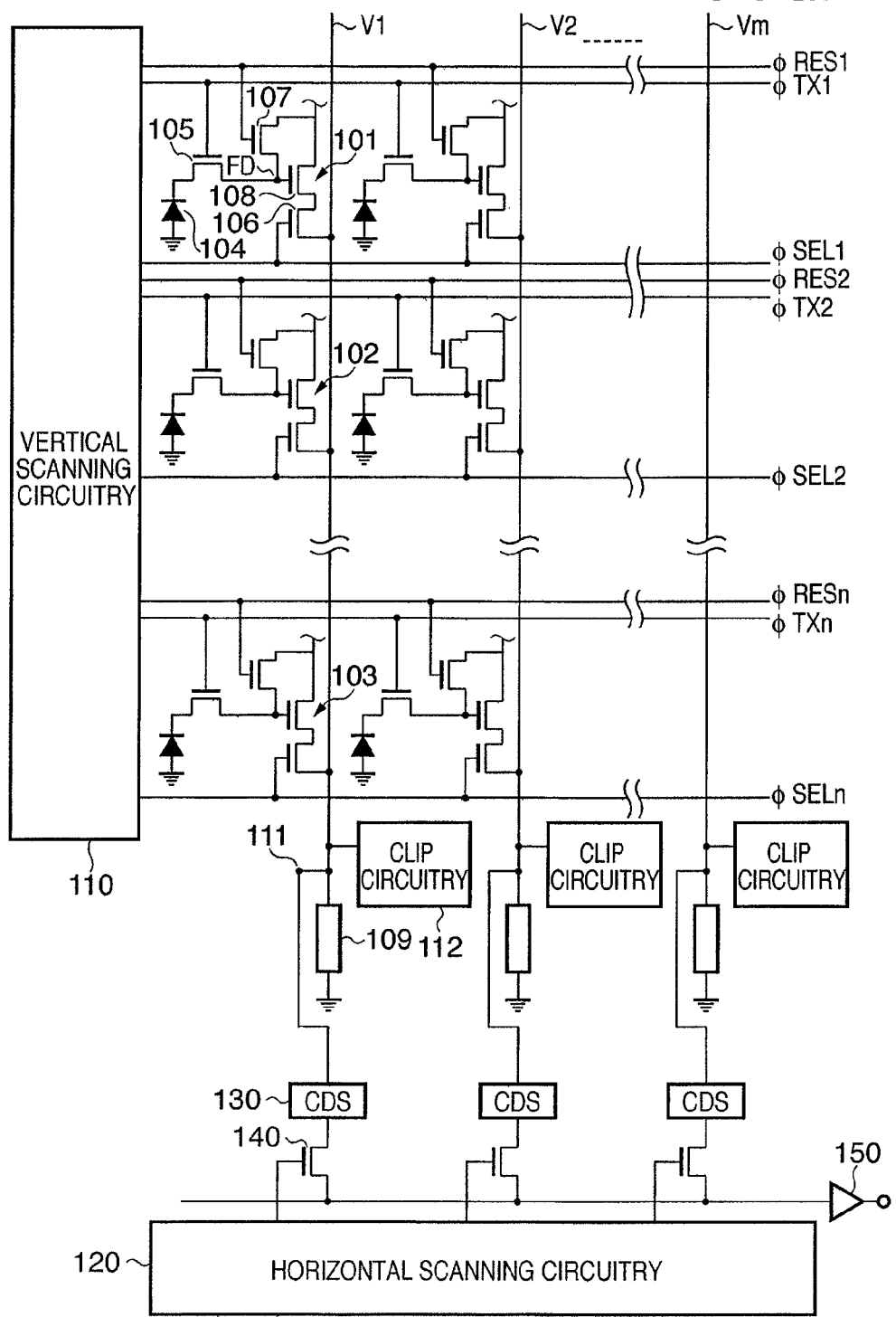
FIG. 1 is a view showing an exemplary circuit of an imaging apparatus according to the first preferred embodiment of the present invention.

FIG. 1 is a view showing the arrangement of an imaging apparatus according to the first preferred embodiment of the present invention. The imaging apparatus includes a plurality of pixels 101 to 103. For illustrative convenience, FIG. 1 shows pixels of 3 rows×2 columns. However, the present invention is not limited to this, and it is possible to array an arbitrary number of pixels in the row and column directions. Each of the pixels 101 to 103 includes a photodiode 104 serving as a photoelectric conversion element, a transfer transistor 105, a floating diffusion FD, a selection transistor 106, a reset switch 107, and a source follower transistor 108. The imaging apparatus also includes vertical output lines $V_1$ to $V_m$ (m is an integer: m≥2, and the same will apply hereinafter), current source loads 109 serving as the load of the source follower transistors 108, selector switches 140, an output amplifier 150, vertical scanning circuitry 110, CDS circuitry 130, and horizontal scanning circuitry 120. The vertical output lines $V_1$ to $V_m$ connect to the ground via the current source loads 109. Each of the vertical output lines $V_1$ to $V_m$ constitutes a source follower together with the source follower transistor 108 and current source load 109 upon selecting a pixel. A node 111 receives the output from the source follower transistor 108.

The photodiode 104 converts light incident on the imaging apparatus into electrical charges. The transfer transistor 105 transfers the electrical charges generated in the photodiode 104 in accordance with transfer pulses $\phi TX_1$ to $\phi TX_n$ (n is an integer: n≥2, and the same will apply hereinafter). The FD temporarily stores the electrical charges. The electrical charges of pixels selected by the selection transistors 106 are converted into a voltage in accordance with selection pulses $\phi SEL_1$ to $\phi SEL_n$ and output to the node 111 via the vertical output lines $V_1$ to $V_m$. Clip circuitry 112 serving as a clip means for limiting the electric voltages connect to the vertical output lines $V_1$ to $V_m$, as will be described later. The node 111 outputs the received electrical charges to the CDS circuitry 130. The selector switches 140 driven by the horizontal scanning circuitry 120 are selectively turned on to select an output signal and externally output the signal via the output amplifier 150. The reset switches 107 remove (reset) the electrical charges stored in the FDs in accordance with reset pulses $\phi RES_1$ to $\phi RES_n$. The vertical scanning circuitry 110 selects the transfer transistors 105, selection transistors 106, and reset switches 107.

Figure 2:
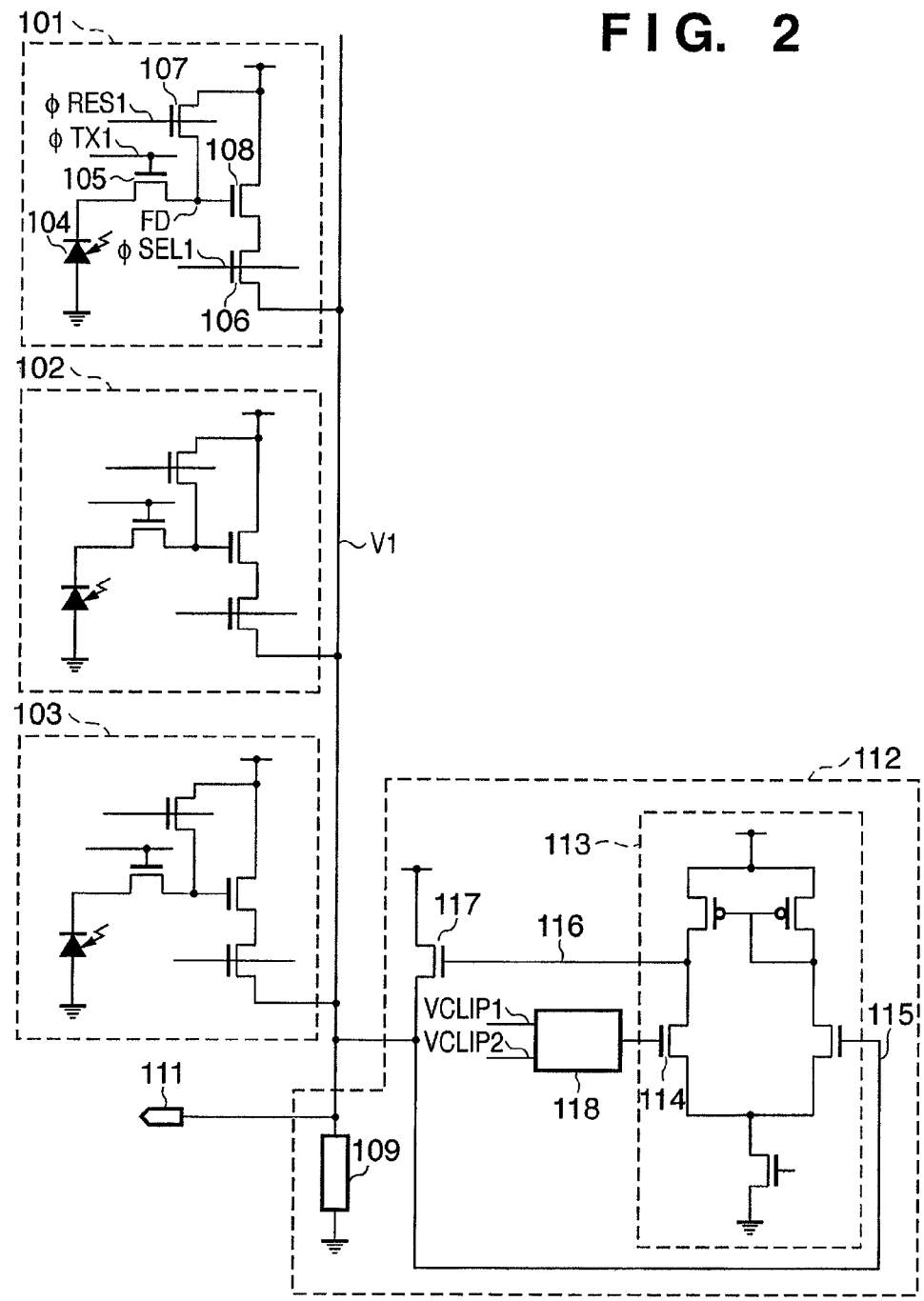
FIG. 2 is a view showing an exemplary circuit of an operational amplifier arranged in the imaging apparatus shown in FIG. 1 and a photoelectric conversion apparatus connected to the operational amplifier.

FIG. 2 is a view showing a more detailed arrangement of the clip circuitry 112 arranged in the imaging apparatus shown in FIG. 1 and a photoelectric conversion apparatus connected to it. For the illustrative convenience, FIG. 2 shows the three pixels 101 to 103. However, the number of pixels is not limited to this.

The clip circuitry 112 and the pixels 101 to 103 share the current source load 109. The clip circuitry 112 causes amplifying circuitry for amplifying a signal based on the electric voltage of the vertical output line $V_1$ to limit (clip) the electric voltage of the vertical output line $V_1$. A differential amplifier 113 serving as an operational amplifier receives a control electric voltage to clip the vertical output line $V_1$ at a noninverting input terminal 114 and the electric voltage of the vertical output line $V_1$ at an inverting input terminal 115. An output terminal 116 of the differential amplifier 113 connects to the gate of an NMOS transistor 117. VCLIP control circuitry 118 selectively supplies one of VCLIP1 and VCLIP2 (<VCLIP1) to the noninverting input terminal 114.

Figure 3:
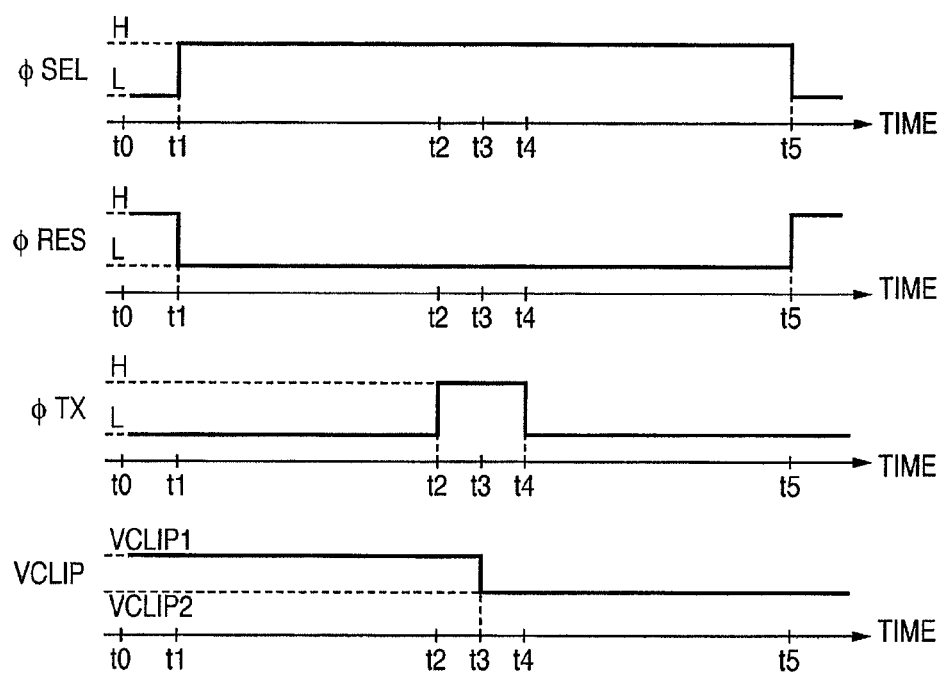
FIG. 3 is an exemplary timing diagram of a set of signals used in a photoelectric conversion apparatus according to the first preferred embodiment of the present invention.

The operation of the photoelectric conversion apparatus according to this embodiment will be described next. FIG. 3 is an exemplary timing diagram of a set of signals used in the photoelectric conversion apparatus according to this embodiment. Referring to FIG. 3, the horizontal axis represents time, and the vertical axis represents the signal waveforms. The operation timing will be explained below by exemplifying the pixel 101. The other pixels can operate in the same way.

At a time $t_0$, the electric potential of the pulse signal $\phi SEL_1$ is at L (Low), while the electric potential of the pulse signal $\phi RES_1$ is at H (High). The pulse signal $\phi TX_1$ is at L to electrically disconnect the photodiode 104 from the floating diffusion FD. The VCLIP control circuitry 118 applies the relatively high voltage VCLIP1 to the noninverting input terminal 114. In this state, the selection transistor 106 is OFF not to read out the output from the source follower transistor 108 in FIG. 1 to the vertical output line $V_1$. The reset switch 107 is ON to set, at the reset level, the electric potential of the floating diffusion FD at the input part of the source follower transistor 108.

At a time $t_1$, the electric potential of the pulse signal $\phi SEL_1$ changes to H, while the electric potential of the pulse signal $\phi RES_1$ changes to L. In this state, the reset switch 107 is OFF, and the selection transistor 106 is ON. Consequently, the source follower transistor 108 starts outputting the reset level to the vertical output line $V_1$. During this operation, if strong light is incident on the pixel 101 to generate electrical charges (electrons) in the photodiode 104, the source follower transistor 108 operates to output a voltage lower than the reset level to the vertical output line V.

In this case, when the electric voltage of the vertical output line $V_1$ is higher than VCLIP1, the differential amplifier 113 causes the output terminal 116 to have a low electric potential (L) so that the NMOS transistor 117 stabilizes in a strong OFF state. This suppresses the subthreshold current of the NMOS transistor 117 to low. When the electric voltage of the vertical output line $V_1$ is lower than VCLIP1, the electric potential of the output terminal 116 of the differential amplifier 113 abruptly rises in accordance with the gain of the differential amplifier 113. The current flowing to the NMOS transistor 117 increases and stabilizes when VCLIP1 and the electric voltage of the vertical output line $V_1$ (the output electric potential of the clip circuitry 112), that is, the electric potential of the noninverting input terminal 114 and that of the inverting input terminal 115 become equal. In either case, a known method is usable to hold, as the reset level, the voltage that has appeared at the node 111 later.

At a time $t_2$, the electric potential of the pulse signal $\phi TX_1$ changes to H to turn on the transfer transistor 105. The transfer transistor 105 transfers the electrical charges (electrons) in the photodiode 104 to the floating diffusion FD. The electric potential of the gate of the source follower transistor 108 lowers in proportion to the amount of light incident on the pixel 101. Accordingly, the electric voltage of the vertical output line $V_1$ decreases. When the noninverting input terminal 114 is at the set clip voltage VCLIP1, and the electric voltage of the vertical output line $V_1$ becomes lower than VCLIP1, the differential amplifier 113 operates to fix the electric voltage of the vertical output line $V_1$ to VCLIP1. Therefore, it is unlikely that the photoreaction is detected.

At a time $t_3$, the VCLIP control circuitry 118 applies the relatively low voltage VCLIP2 (<VCLIP1) to the noninverting input terminal 114. As a result, when the electric voltage of the vertical output line $V_1$ is higher than VCLIP2, the NMOS transistor 117 stabilizes in a strong OFF state and suppresses its subthreshold current to low. At this time, the electric potential of the source of the NMOS transistor 117 is higher than that of the gate. This interrupts the negative feedback constituted with respect to the clip circuitry 112 to output the pixel output itself to the vertical output line $V_1$. Note that VCLIP2 is preferably such a voltage as to read out the electrical charges of the amount of saturation signal of the photodiode 104.

At a time $t_4$, the electric potential of the pulse signal $\phi TX_5$ changes to L to turn off the transfer transistor 105 so that the transfer of the electrical charges (electrons) in the photodiode 104 finishes.

At a time $t_5$, the electric potential of the pulse signal $\phi SEL_5$ changes to L, while the electric potential of the pulse signal $\phi RES_5$ changes to H. This turns the selection transistor 106 off to set the electric potential of the floating diffusion FD at the reset level.

As described above, this embodiment enables a clip operation of setting the electric voltage of the vertical output line $V_1$ to VCLIP1 or VCLIP2 by dynamically controlling the voltage to be applied to the gate of the NMOS transistor 117 by differential amplification. Before the start of the clip operation, the NMOS transistor 117 of the clip circuitry is forced off. This causes the subthreshold current characteristic of the NMOS transistor 117 almost to be negligible. The negligible degree depends on the gain of the differential amplifier 113. For example, if the gain of the differential amplifier 113 is K, an S factor representing the subthreshold current characteristic of the NMOS transistor 117 of the clip circuitry is actually 1/K. This is particularly equivalent to clip circuitry constituted by using a transistor with an excellent OFF characteristic.

According to this embodiment, since a feedback to cause the NMOS transistor 117 of the clip circuitry to output VCLIP1 or VCLIP2 exists, it is possible to invalidate the threshold variations in the NMOS transistor 117.

This embodiment uses the differential amplifier 113 as shown in FIG. 2. However, the present invention is not limited to this, and the arrangement is changeable as needed in consideration of the circuit scale, stability, and power consumption.

In this embodiment, the VCLIP control circuitry 118 dynamically changes VCLIP1 and VCLIP2. However, to prevent, for example, a voltage drop in the vertical output line $V_1$, the noninverting input terminal 114 may directly receive VCLIP2 without the intervention of the VCLIP control circuitry 118.

This embodiment assumes that the differential amplifier 113 shown in FIG. 2 always operates. However, the differential amplifier 113 may operate, for example, only at the operation timing of the source follower transistor 108. Hence, low power consumption can be realized by dynamically controlling the power supply and power consumption of the differential amplifier 113.

Second Embodiment

Figure 4:
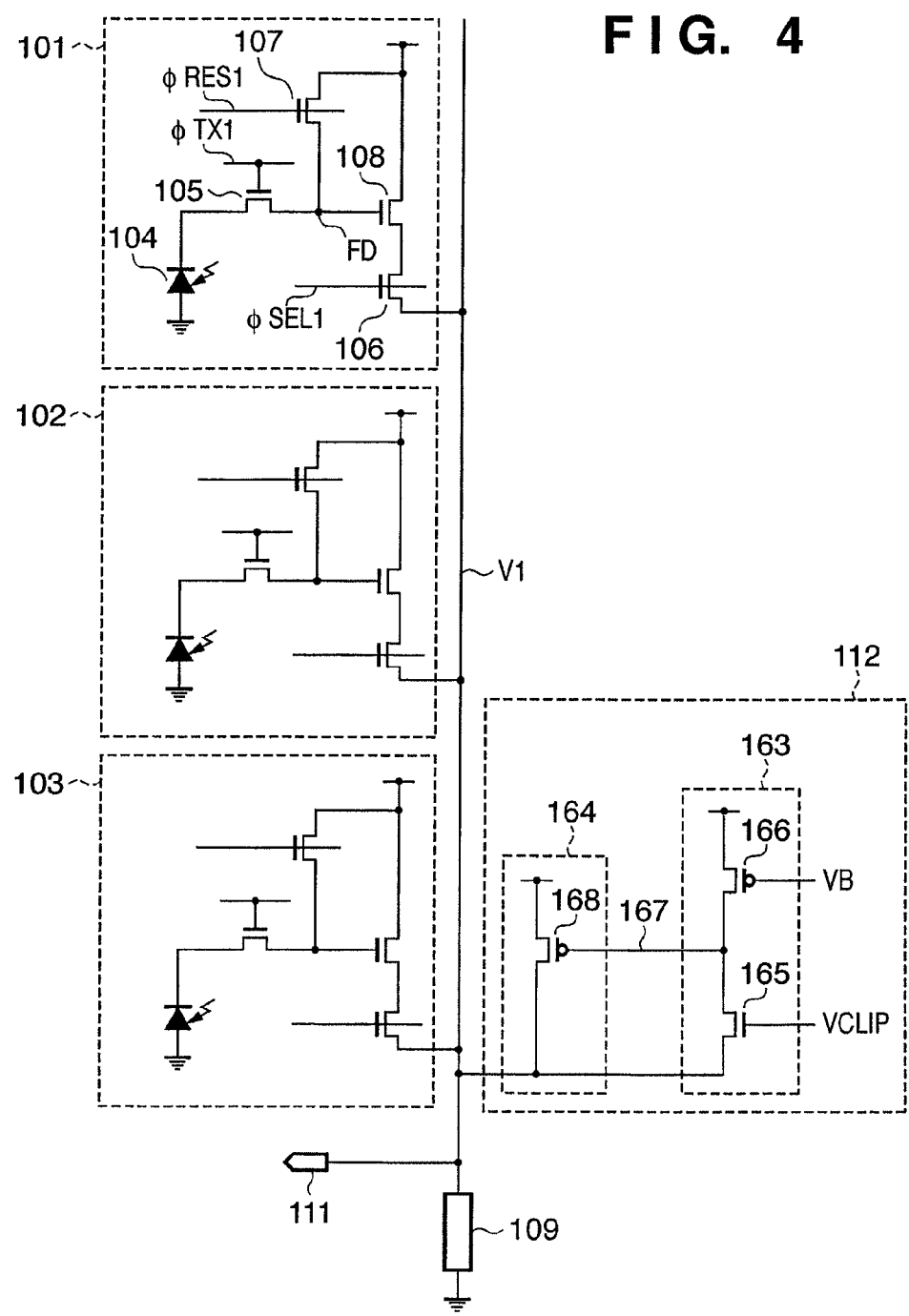
FIG. 4 is a view showing an exemplary circuit of an imaging apparatus according to the second preferred embodiment of the present invention.

FIG. 4 is a view showing an arrangement of an imaging apparatus according to the second preferred embodiment of the present invention. The imaging apparatus includes a plurality of pixels 101 to 103, as in the first embodiment.

Clip circuitry 112 has amplifying circuitry including a common gate amplifier 163 and a common source amplifier 164. The common gate amplifier 163 outputs a voltage according to the difference between a vertical output line $V_1$ and VCLIP1 to a node 167. The common source amplifier 164 has the node 167 as an input node. The common source amplifier 164 and the source followers of the pixels 101 to 103 share a current source load 109. The output node of the common source amplifier 164 connects to vertical output line $V_1$.

The operation of the imaging apparatus according to this embodiment will be described next. The operation of the first embodiment can directly apply to the operation timing of a pixel of the imaging apparatus according to this embodiment. Hence, only the operation of the clip circuitry 112 of this embodiment will be described below.

At a time $t_1$, when strong light is incident on the pixel 101 at the start of operation of outputting the reset level to the vertical output line $V_1$, the transistor operates to output a voltage lower than the reset level to the vertical output line $V_1$. At this time, if the electric potential is lower than VCLIP1 by the threshold value of an NMOS transistor 165, the common gate amplifier 163 in the clip circuitry 112 detects the decrease in electric voltage of the vertical output line $V_1$. At this time, the common gate amplifier 163 outputs a voltage with a positive gain for the change amount in the vertical output line $V_1$ to the node 167 serving as the input of the common source amplifier 164. For this reason, the drain current of a PMOS transistor 168 abruptly rises in accordance with the decrease in the vertical output line $V_1$. The vertical output line $V_1$ stabilizes when the sum of the drain current of the PMOS transistor 168 and the current flowing to the common gate amplifier 163 becomes equal to the value of the current flowing to the current source load 109.

As described above, this embodiment can implement clip circuitry having a high clip capability by using a small number of transistors.

In this embodiment, from the viewpoint of efficient clip operation, it is preferable to set the value of the current flowing to a PMOS transistor 166 serving as the current source load of the common gate amplifier 163 to be smaller than that of the current flowing to the current source load 109 to increase the gain of the common gate amplifier.

For the same reason, it is preferable to set the current flowing to the common gate amplifier to be lower than the drain current flowing to the PMOS transistor 168. To do this, the transistor sizes are designed such that the transconductance of the PMOS transistor 168 becomes larger than that of the NMOS transistor 165 and PMOS transistor 166, thereby making the driving force of the PMOS transistor 168 larger.

In this embodiment, the clip circuitry 112 includes the cascade connection of the common gate amplifier and common source amplifier. However, the present invention is not limited to this.

Third Embodiment

In the third preferred embodiment of the present invention, an embodiment that controls the clip operation by controlling, for each column, the value of the current to flow to the current source load of a common gate amplifier 163 in the clip circuitry of the second embodiment will be described. This embodiment allows to improve the signal nonuniformity between columns, which takes place due to characteristic variations between clip circuitry by manufacturing variations.

Figure 5:
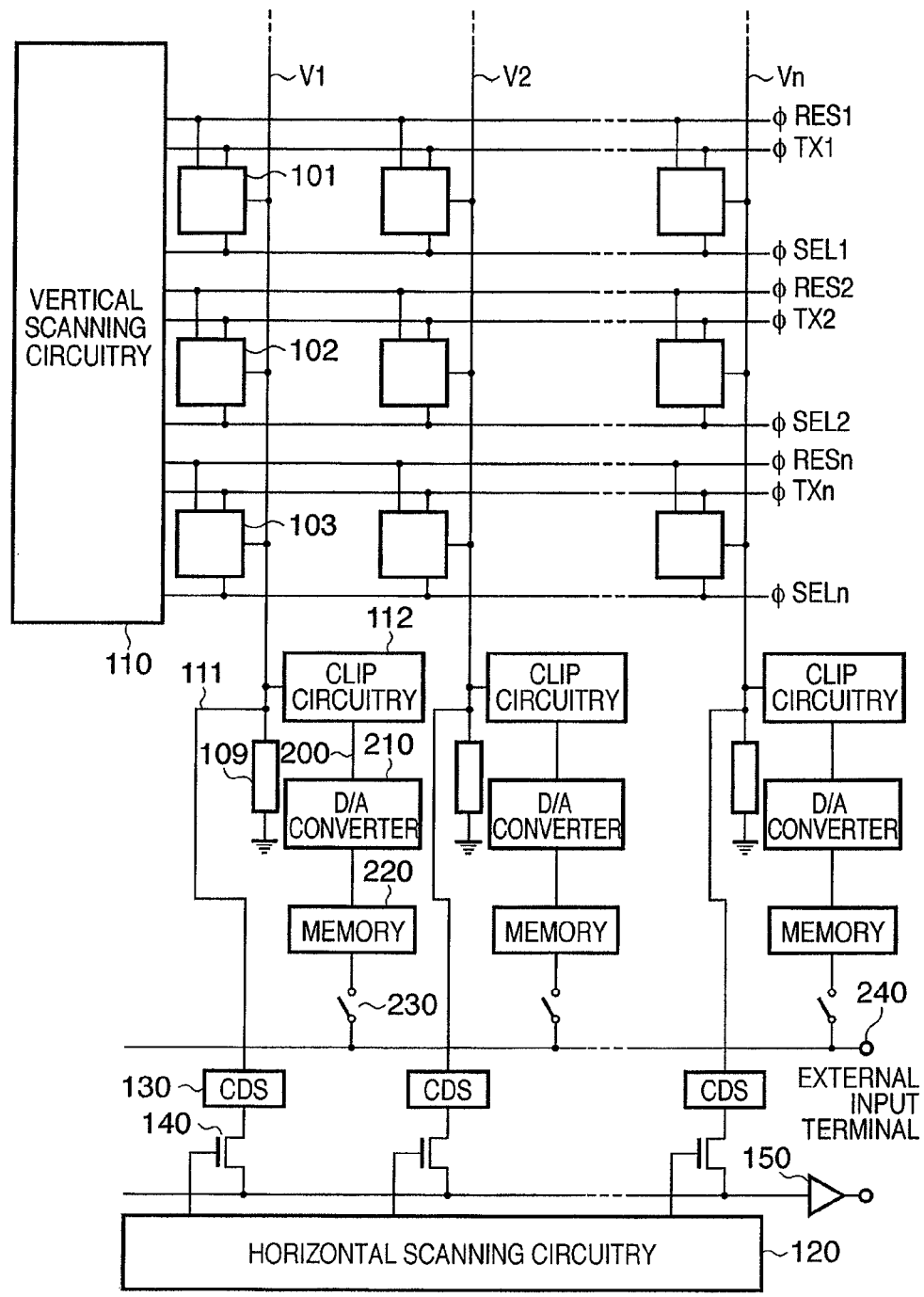
FIG. 5 is a view showing an exemplary circuit of an imaging apparatus according to the third preferred embodiment of the present invention.

FIG. 5 is a view showing an arrangement of an imaging apparatus according to the third preferred embodiment of the present invention. A D/A (Digital to Analog) converter 210 that supplies a bias voltage to the current source load of a common gate amplifier connects to each clip circuitry 112. A column memory unit 220 connects to the D/A converter 210. An external input terminal 240 connects to each column memory unit 220 via a column memory selector switch 230.

The operation of the imaging apparatus will be described next. The characteristic of clip circuitry varies due to, for example, manufacturing variations. This varies the clip voltage of a vertical output line. An externally prepared memory table stores the clip voltage variation between the columns. Based on the clip voltage variation, the apparatus calculates a bias voltage value to correct the variations between the columns and inputs the digital value of the bias voltage from the external input terminal 240 to the CMOS image sensor. The column memory units 220 sequentially store the correction data input from the external input via the column memory selector switches 230. After storage in the memory finishes, the D/A converter 210 converts the digital value into an analog voltage value. It is possible to correct the clip voltage by controlling the current value of the common gate amplifier in the clip circuitry 112 by the corrected bias voltage. This allows to obtain an imaging result with an improved signal nonuniformity between columns.

In this embodiment, the apparatus sequentially receives the variation amount correction data of the clip circuitry between the columns from an externally prepared memory table. However, the method of reflecting the corrected bias voltage data is not limited to this.

Fourth Embodiment

In the fourth preferred embodiment of the present invention, an imaging apparatus will be described, which can execute an optimum clip operation according to its driving conditions based on the fact that a current flowing in clip circuitry can control the clip operation.

Figure 6:
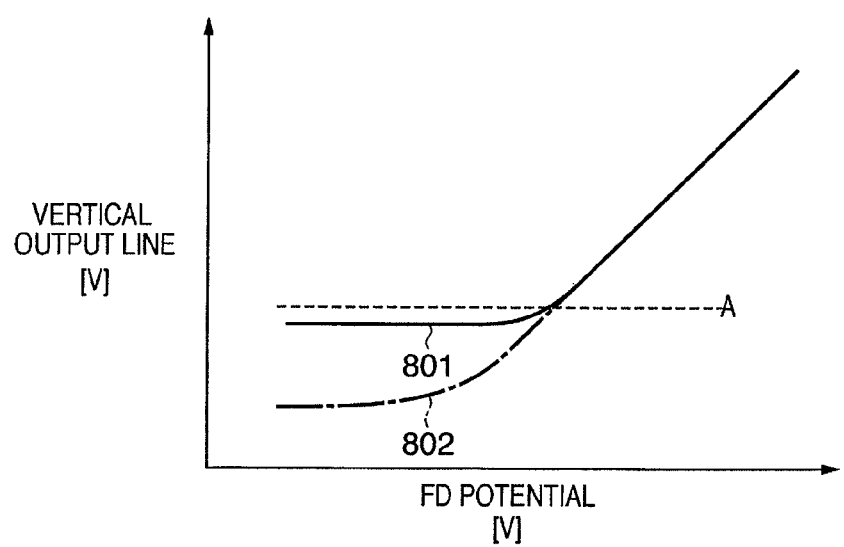
FIG. 6 is an exemplary graph showing the change in electric voltage of the vertical output line with respect to the change in electric potential of the floating diffusion.

In the circuitry of the second embodiment, a current value controls the gain of the common gate amplifier. FIG. 6 is a graph showing the change in clip operation by gain control. Referring to FIG. 6, the horizontal axis represents the electric potential of FD, and the vertical axis represents the electric voltage of the vertical output line.

When the vertical output line reaches a predetermined voltage indicated by a line A in FIG. 6, the clip circuitry starts operating. At this time, if the gain of the common gate amplifier of the clip circuitry is high, the apparatus executes the clip operation while slightly decreasing the electric voltage of the vertical output line, as indicated by a curve 801. This improves the clip capability.

Conversely, if the gain is low, the clip circuitry exhibits a clip operation as indicated by a curve 802. When the gain is low, the clip capability is also low. However, since the switching point becomes moderate, the resistance against the variations in pixel output increases.

Figure 7:
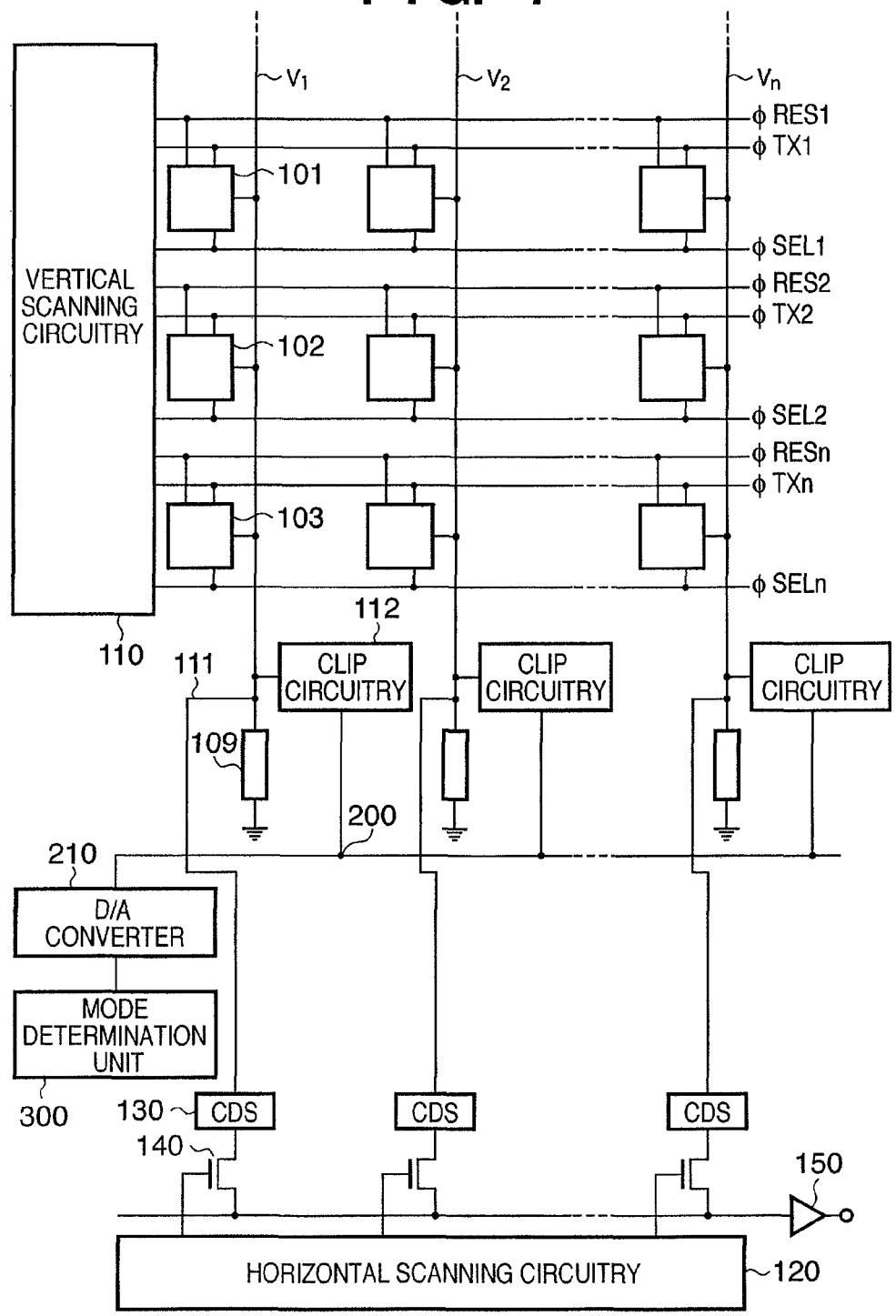
FIG. 7 is an exemplary circuit of an imaging apparatus according to the fourth preferred embodiment of the present invention.

FIG. 7 shows an embodiment of an imaging apparatus using the above-described characteristic. The imaging apparatus includes pixels 101 to 103, clip circuitry 112, a D/A converter 210, a mode determination unit 300, current source loads 109, vertical scanning circuitry 110, horizontal scanning circuitry 120, CDS circuitry 130, selector switches 140, and an output amplifier 150.

In FIG. 7, the mode determination unit 300 determines the driving conditions of the imaging apparatus to apply a bias voltage according to the driving conditions to the D/A converter 210 as a digital value. The D/A converter 210 converts the digital value into an analog voltage and applies it to the clip circuitry via a node 200.

An example will be described in which the CDS circuitry 130 includes a signal amplifying function and adjusts the bias voltage in accordance with the gain. When the gain is high, the imaging conditions are determined as conditions under a low illuminance where blackening hardly occurs. The bias voltage to implement the clip operation as indicated by the curve 802 in FIG. 6 is set to do low noise setting. When the gain is low, the imaging conditions are determined as conditions under a high illuminance where blackening readily occurs. The bias voltage to implement the clip operation as indicated by the curve 801 in FIG. 6 is set, focusing on a wider dynamic range and reduction of variations in clip potential.

A method of optimizing the clip operation in accordance with the gain of the CDS circuitry has been described above. However, this embodiment not only applies in changing the gain of the CDS circuitry but also enables an optimum clip operation in accordance with the driving conditions of the imaging apparatus in switching between a moving image and a still image or switching the readout scheme.

The third and fourth embodiments control the current value by causing the D/A converter to adjust the bias voltage to be applied to the gate of the transistor serving as a current source load. However, the current value adjusting method is not limited to this.

The above embodiments have been described by exemplifying a pixel structure including four transistors, that is, a selection transistor, source follower transistor, reset switch (reset transistor), and transfer transistor. However, the present invention is not limited to this. Any other pixel structure is applicable if it can ensure the difference between the reset level and the signal level.

Application Example

FIG. 8 is a view showing the arrangement of an imaging system using the imaging apparatus according to the preferred embodiment of the present invention. This system performs photoelectric conversion by causing light (object image) from an object to pass through the opening defined by diaphragm blades 1 and form an image on a photoelectric conversion apparatus 4 via a lens 2 serving as a photographing optical system. A filter group 3 includes a combination of, for example, an optical lowpass filter that cuts high-frequency components of light to prevent moiré, a color correction filter, and an infrared cut filter. The photoelectric conversion apparatus 4 causes a horizontal scanning circuitry 120 and a vertical scanning circuitry 110 to two-dimensionally select a pixel in accordance with a signal from an address designation unit 8 and outputs a signal to a timing adjustment unit 7. The timing adjustment unit 7 adjusts the timing of one or a plurality of output signals from the photoelectric conversion apparatus 4. An AGC (Auto Gain Controller) 10 controls the voltage of the signal output from the timing adjustment unit 7. An A/D converter 11 converts the signal into a digital signal to generate image information. A camera DSP 12 processes the image information of a moving image or a still image. An MPU 14 serving as a control unit sets, in the camera DSP 12, parameters to be used for image processing or executes an AF/AE operation. A focus motor 51 moves a focus lens (not shown) back and forth to perform the AF operation. A DRAM 13 serves as a temporary storage area for image processing. A recording medium 18 serves as a nonvolatile storage area. Examples of the recording medium 18 are a smart medium, a magnetic tape, and an optical disk. A video encoder 15 and a CRT 16 display a processed image. A viewfinder 17 using, for example, an LCD is used to see the object before storage in the recording medium 18. The output devices are not limited to the CRT 16 and viewfinder 17. For example, a printer is also usable. An oscillator 9 generates a clock signal to be supplied to the camera DSP 12 and MPU 14. A display region designation unit 19 designates a display region to display, on, for example, the viewfinder 17, an image read out from the photoelectric conversion apparatus 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216216, filed Aug. 8, 2006, 2007-053339, filed Mar. 2, 2007, which are hereby incorporated by reference herein in their entirety.

What is claimed is:

1. A photoelectric conversion apparatus comprising:
a vertical output line;
a pixel including a photoelectric conversion unit configured to convert light into charges and to store the charges, an amplifying unit configured to output a signal corresponding to the charges stored in the photoelectric conversion unit to the vertical output line, and a reset unit configured to reset an input of the amplifying unit;
a current source load electrically connected to the vertical output line, wherein a source follower is constituted by the amplifying unit of the pixel and the current source load; and
a clip unit electrically connected to the vertical output line so as to limit a voltage of the vertical output line,
wherein the clip unit includes:
amplifying circuitry configured to amplify a signal corresponding to the electric voltage of the vertical output line, and
a MOS transistor configured to limit the electric voltage of the vertical output line based on a difference in electric potential between gate and source of the MOS transistor,
wherein the amplifying circuitry includes an operational amplifier with an inverting input terminal connected to the vertical output line, a noninverting input terminal to which a predetermined voltage is applied, and an output terminal connected to the gate of the MOS transistor, and
wherein the clip unit further includes a control unit configured to apply the predetermined voltage to the noninverting input terminal,
wherein the control unit applies a first voltage as the predetermined voltage to the noninverting input terminal when a reset level set by the reset unit is read out to the vertical output line, and
wherein the control unit applies a second voltage, which is lower than the first voltage, as the predetermined voltage to the noninverting input terminal when a signal based on the electrical charges stored in the photoelectric conversion unit is read out to the vertical output line.

2. A photoelectric conversion apparatus according to claim 1, wherein the operational amplifier performs an operation to stabilize the electric voltage of the vertical output line to be the first voltage in a case where the electric voltage of the vertical output line is lower than the predetermined voltage when the reset level set by the reset unit is read out to the vertical output line.

3. A photoelectric conversion apparatus according to claim 1, wherein the photoelectric conversion apparatus is incorporated in an imaging apparatus that includes:

vertical scanning circuitry configured to sequentially select a plurality of pixels arranged on the photoelectric conversion apparatus; and horizontal scanning circuitry configured to sequentially select the vertical output line and read out a signal from the pixels selected by the first scanning circuitry.

4. A photoelectric conversion apparatus according to claim 3, wherein the imaging apparatus is incorporated in an imaging system that includes a photographing optical system, and wherein the imaging apparatus photoelectrically converts an object image and generates image information.

* * * * *